United States Patent Office 2,757,070
Patented July 31, 1956

2,757,070

PREPARATION OF MERCURIC FLUORIDE BY REACTION OF MERCURIC OXIDE AND HYDROGEN FLUORIDE GAS

Earl L. Muetterties, Hockessin, Del., assignor to E. I. du Pont de Nemours and Company, Wilmington, Del., a corporation of Delaware No Drawing. Application March 25 1954,
Serial No. 418,766

5 Claims. (Cl. 23—88)

This invention relates to preparation of inorganic fluorides, particularly fluorides of mercury.

Recent growth of interest in fluorine chemistry has stimulated production and use of fluorinating substances. Mercuric fluoride, i. e., mercury II fluoride ($HgF_2$), is a most useful fluorinating agent because of the readiness with which it reacts as desired and the ease with which the mercury is recovered, among other reasons. However, no economically satisfactory method for preparation of mercuric fluoride has been available hitherto. The present invention remedies that difficulty.

A primary object of this invention is preparation of mercuric fluoride by an economical method. A particular object is production of anhydrous mercuric fluoride from mercuric oxide. Other objects of the invention will be apparent from the following description.

In general, the objects of this invention are attained by reacting mercuric oxide with hydrogen fluoride at temperature of at least about 250° C., preferably 350° C. to upwards of 500° C.; it is particularly desirable to carry out the reaction in a flow system, under superimposed oxygen pressure, with temperatures in the vicinity of 450° C.

Passage of hydrogen fluoride over mercuric oxide at temperature above about 400° C. may result principally in production of elemental mercury, along with conversion of a small amount of reactants to mercuric fluoride. For example, with the temperature starting at 300° C. and rising in three hours to 460° C. a stream of hydrogen fluoride may convert only about one fourth of one per cent of the starting oxide to mercuric fluoride, while over ninety-nine per cent of the oxide dissociates to free mercury. By preventing this thermal dissociation, addition of uncombined oxygen is conducive to attainment of the objects of the present invention, as is exemplified below.

EXAMPLE

A nickel boat containing 10 parts mercuric oxide, i. e., mercury II oxide (HgO), is placed in a stainless steel reactor. A gaseous stream of hydrogen fluoride mixed with oxygen passes through the reactor slowly for 4½ hours, while the temperature remains within the range of 380–450° C. At the end of this time the boat contains 11 parts of a pale yellow-to-white solid. X-ray analysis shows the major component to be mercuric fluoride, revealing also very weak lines attributable to a hydrated fluoride of mercury. Calculated content of fluorine for mercuric fluoride is 16.0%, while the value observed by analysis is 13.0%. None of the original mercuric oxide remains unchanged.

Although production of mercuric fluoride by reaction of hydrogen fluoride with mercuric oxide will occur at temperature as low as 250° C., a substantial part of the product is likely to be hydrated at such low temperature. As hydrated fluoride of mercury is not so effective as the anhydrous fluoride in many fluorination reactions, the reaction preferably is carried out at higher temperature, particularly at least 350° C. Usefulness of temperatures above about 500° C. depends in large part upon stability of pipes, valves, vessels, or other devices necessarily exposed to the hydrogen fluoride and mercury compounds.

It is convenient in semi-scale operations to confine the reactants in a "bomb" type of reactor made of relatively stable materials, such as nickel or the alloy known as "Hastelloy C," to avoid undue contamination. If desired, the vessel may be charged at room temperature or lower, and the gaseous products may be bled off while the reactor is hot. The following table presents results of several runs made under different conditions of temperature using this method and the ingredients specified. Elapsed time at the high temperature was three hours for each run. Analysis of the products was principally by X-ray because of its convenience and reliability. Parts are by weight.

Table

| Run | Charge | Temperature, ° C. | Products |
|---|---|---|---|
| A | 22 pts. HgO<br>50 pts. HF | 100 | $HgF_2$ hydrate. |
| B | 22 pts. HgO<br>60 pts. HF | 250 | $HgF_2$ hydrate and $HgF_2$. |
| C | 22 pts. HgO<br>60 pts. HF | 350 | $HgF_2$ and less $HgF_2$ hydrate. |
| D | 22 pts. HgO<br>60 pts. HF<br>4 pts. $O_2$ | 450 | $HgF_2$ and trace $NiF_2$. |

The above table shows especially the desirability of high temperature in preparation of anhydrous mercuric fluoride according to this invention. When, as here, autogenous pressure accompanies the reaction method, about a threefold molar excess of hydrogen fluoride is desirable. Imposed oxygen pressure, which is necessary in run D as in the detailed example, should exceed the dissociation pressure of the oxide reactant. Presence of nickel fluoride in the product of this run apparently is accounted for by corrosion of the pressurized reaction vessel at this elevated temperature. Such corrosion is not a problem when the reaction is carried out in a flow system.

As mercuric fluoride is extremely sensitive to moisture, exclusion of water from contact with the product is highly desirable. Contact with water may convert mercuric fluoride to a hydrate that dissociates upon heating by loss of hydrogen fluoride instead of water. This again suggests the desirability of producing mercuric fluoride by a continuous process, for water vapor formed in the reaction may be swept out by the gas flow.

The usefulness of mercuric fluoride in fluorination of both organic and inorganic compounds has been mentioned above. An instance is the conversion of elemental carbon to carbon tetrafluoride and other fluorocarbons upon contact at temperature above about 500° C., as set forth in Farlow and Muetterties patent application Serial No. 410,721 filed Feburary 16, 1954, now U. S. Patent No. 2,709,187. The advantages of preparing mercuric fluoride according to the present invention are readily apparent.

What is claimed:

1. The process for the preparation of mercuric fluoride which comprises reacting mercuric oxide with hydrogen fluoride at a temperature of at least 250° C. and in the presence of gaseous oxygen at an oxygen pressure in excess of the oxygen dissociation pressure of the mercuric oxide at the temperature employed.

2. The process of claim 1 performed continuously by a flow of gaseous hydrogen fluoride and oxygen over solid mercuric oxide.

3. The process for the preparation of mercuric fluoride which comprises reacting mercuric oxide and hydrogen fluoride at a temperature of at least about 350° C. and at an oxygen pressure in excess of the oxygen dissociation pressure of the mercuric oxide at the temperature employed.

4. The process of claim 3 in which the reaction is carried out at a temperature in the vicinity of 450° C.

5. The process for the preparation of mercuric fluoride which comprises passing over mercuric oxide at a temperature of at least about 450° C. a gaseous mixture of hydrogen fluoride and oxygen having an oxygen pressure in excess of the oxygen dissociation pressure of the mercuric oxide at the temperature employed.

References Cited in the file of this patent

UNITED STATES PATENTS

| | | |
|---|---|---|
| 1,851,475 | Zimmermann | Mar. 29, 1932 |
| 2,602,725 | Wilhelm et al. | July 8, 1952 |

FOREIGN PATENTS

| | | |
|---|---|---|
| 335,703 | Great Britain | Oct. 2, 1930 |

OTHER REFERENCES

J. W. Mellor's "A Comprehensive Treatise on Inorganic and Theoretical Chemistry," vol. 4, 1923 ed., pp. 776, 794. Longmans, Green and Co., N. Y.

Thorpe's Dictionary of Applied Chemistry, vol. 7, fourth ed., 1946, pages 573, 574. Longmans, Green and Co., N. Y.

"Encyclopedia of Chemical Reactions," by C. A. Jacobson, 1951 ed., vol. 4, page 620. Reinhold Publishing Corp., N. Y.